(No Model.)
D. W. LEEDY.
ANIMAL TRAP.
No. 531,544. Patented Dec. 25, 1894.
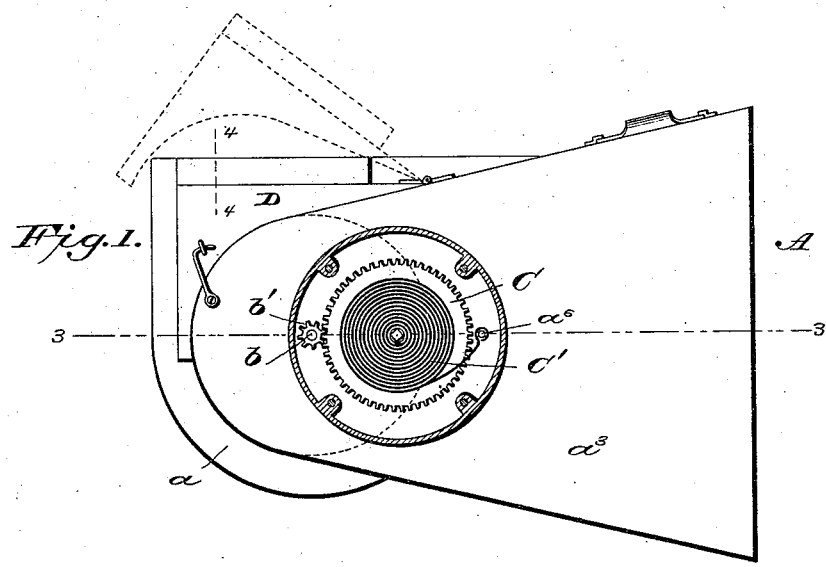
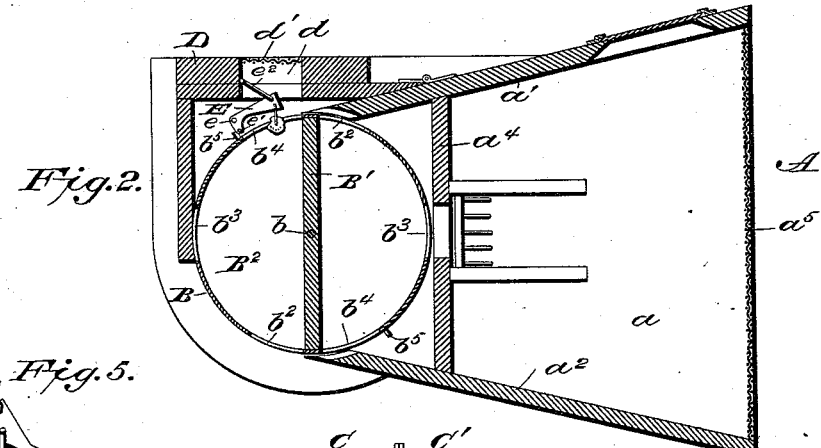
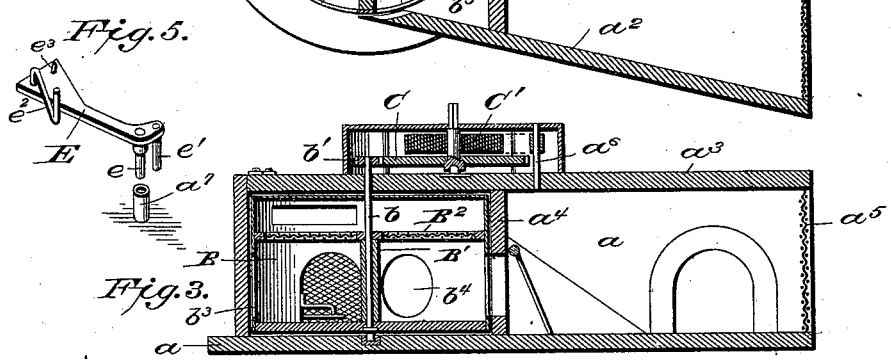
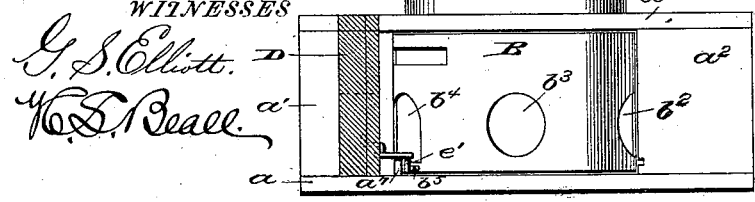
WITNESSES
G. S. Elliott.
H. S. Beall.
David W. Leedy
INVENTOR

UNITED STATES PATENT OFFICE.

DAVID W. LEEDY, OF LIMA, OHIO.

ANIMAL-TRAP.

SPECIFICATION forming part of Letters Patent No. 531,544, dated December 25, 1894.

Application filed August 16, 1894. Serial No. 520,518. (No model.)

*To all whom it may concern:*

Be it known that I, DAVID W. LEEDY, a citizen of the United States of America, residing at Lima, in the county of Allen and State of Ohio, have invented certain new and useful Improvements in Animal-Traps; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a self-set and ever-set animal trap which is simple in construction and effective in operation; and it consists in combining in an animal trap a spring-actuated rotatable cage and a detent of improved construction, whereby when said detent is moved by the animal the cage is given a half rotation so as to bring an opening therein in line with an opening which leads to a receiving chamber and is provided with a self-closing door.

The invention further consists in the special construction and combination of the parts, as will be hereinafter fully set forth and particularly pointed out in the claims.

In the accompanying drawings, Figure 1 is a plan view of a trap constructed in accordance with my invention, the top of the casing which incloses the actuating spring being removed. Fig. 2 is a horizontal sectional view. Fig. 3 is a longitudinal sectional view on the line 3—3 of Fig. 1. Fig. 4 is a sectional view on the line 4—4 of Fig. 1, and Fig. 5 is a detail view of the detent.

A designates a suitably constructed casing which is preferably made up of a base piece $a$, side pieces $a'$ and $a^2$, top $a^3$ and partition $a^4$, the side pieces and partition being rigidly secured to the top and bottom pieces. One end of the casing is left open to receive the rotatable cage B while the other end is closed by a wire netting $a^5$. One of the side pieces is provided with a doorway for removing the animals from the trap, and the partition $a^4$ is provided with an opening having a self-closing door of the usual construction.

The rotatable cage B is suitably journaled between the top and bottom pieces of the casing A upon a shaft $b$ the upper end of which projects beyond the top of the casing and has keyed thereto a pinion $b'$. This pinion meshes with a gear-wheel C the spindle of which has attached thereto one end of a spring C' the other end of which is attached to a pin secured to the top of the casing. The upper end of the spindle of the gear-wheel C projects through the casing which inclosed the spring and gear-wheel and is key-ended for the purpose of winding the spring. The rotatable cage B is a cylinder having a transverse partition B' and a horizontal partition $B^2$ which divide the cage into three compartments, the horizontal partition consisting in part of a wire fabric for the purpose hereinafter set forth. The upper compartment formed by the partition $B^2$ is provided with an opening through one side of the cage so that bait may be placed therein for storage and for the purpose of attracting the animals to the inside of the cage. The lower compartments of the rotatable cage are each provided with three openings, $b^2$, $b^3$ and $b^4$, the openings $b^2$ and $b^4$ being on a direct line with each other parallel with the partition B' while the opening $b^3$ is at right angles therewith, as shown more clearly in Fig. 2.

To one side of the casing A is hinged a section D which closes over a part of the rotatable casing and is secured in place by a hook and eye as shown, said section extending far enough around the side of the rotatable cage to close the opening $b^3$ therein. The section D is provided with an opening $d$ which is on a line with the openings $b^2$ and $b^4$ in the rotatable cage when the trap is set, the opening $d$ being covered by a wire fabric $d'$. By swinging this section upon its hinges access can be had to the detent hereinafter described.

E designates the detent which is pivoted in a socket $a^7$ projecting from the base piece $a$ of the trap, said detent comprising a plate having pins $e$ and $e'$ depending therefrom, one of which enters the socket, and upwardly projecting pins $e^2$ and $e^3$, the pin $e^3$ receiving the bait while the pin $e^2$ limits the movement of the detent in one direction by striking against one of the walls of the opening in the section D, as shown in Fig. 2. The depending pin $e'$ is adapted to be engaged by pins $b^5$ which project from the side of the rotatable cage, said pins $b^5$ being located diametrically opposite each other, and when one of the pins is in engagement with the detent, as shown in Fig. 2, the trap is set.

In use the spring is first wound either by turning the rotatable cage or the spindle of the gear-wheel C by means of a key, bait is placed upon the pin $e^3$, the detent placed in engagement with one of the pins $b^5$ and the section D closed and hooked. The trap is then set. The animal being attracted by the bait passes through the opening $b^2$ into one of the lower compartments of the cage and pulling on the bait trips the detent releasing the rotatable cage which makes a half rotation or moves round till the other pin $b^5$ engages the depending pin $e'$ of the detent, the detent being moved in proper position by the cage moving the long end of the same. By this operation the compartment containing the animal would be moved around so that the opening $b^3$ therein is on a line with the opening in the partition $a^4$ through which the animal will pass into the receiving chamber. The operation is repeated when another animal trips the detent.

Having thus described my invention, what I claim as new, and desire to secure by Letters Patent, is—

1. In an animal trap, the combination, of a rotatable cage with a central partition forming two compartments each having three openings in its side wall two of which are located opposite each other and adjoining the partition, pins projecting from opposite sides of the cage, and a pivoted detent having a pin which engages with the pins projecting from the cage to hold said cage against rotation, the detent also having an end which is engaged by the cage to move said detent in the path of the projecting pins and means for limiting the movement of the detent by engaging with a fixed part of the trap, the parts being combined and organized so that one of the openings in each compartment will be successively brought on a line with an opening leading into the prison-chamber and provided with a self-closing door.

2. In an animal trap, the combination, of a rotatable cage having a horizontal partition formed in part of a wire fabric, an upper compartment formed by the partition, said upper compartment having an opening leading thereto which is normally closed by the frame of the trap, substantially as described.

3. In an animal trap, the combination, of a rotatable cage and detent constructed substantially as shown, a hinged section D having an opening one of the side walls of which is adapted to engage with the detent, for the purpose set forth.

In testimony whereof I affix my signature in presence of two witnesses.

DAVID W. LEEDY.

Witnesses:
   P. T. MELL,
   S. D. CUTES.